United States Patent [19]

Murdock et al.

[11] Patent Number: 4,933,383
[45] Date of Patent: Jun. 12, 1990

[54] FAST SETTING STARCH-BASED CORRUGATING ADHESIVE HAVING FULLY HYDROLYZED COLD WATER INSOLUBLE POLYVINYL ALCOHOL COMPONENT

[75] Inventors: Thomas O. Murdock, Vadnais Heights; Paul L. Krankkala, Woodbury, both of Minn.

[73] Assignee: H. B. Fuller Company, St. Paul, Minn.

[21] Appl. No.: 295,303

[22] Filed: Jan. 10, 1989

Related U.S. Application Data

[62] Division of Ser. No. 885,933, Jul. 15, 1986, Pat. No. 4,826,719.

[51] Int. Cl.$^5$ .................. C08L 3/00; C08L 29/04
[52] U.S. Cl. ..................... 524/52; 156/328; 524/47; 524/48; 524/53; 524/557
[58] Field of Search ............ 524/47, 48, 52, 53, 524/803, 557; 156/328

[56] References Cited

U.S. PATENT DOCUMENTS

| | | | |
|---|---|---|---|
| 3,536,651 | 10/1970 | Griffiths | 156/210 |
| 4,008,116 | 2/1977 | Sebel | 156/328 |
| 4,094,718 | 6/1978 | Czerwin | 524/52 |
| 4,600,739 | 7/1986 | Krankkala | 524/48 |
| 4,673,698 | 6/1987 | Krankkala | 524/48 |
| 4,677,145 | 6/1987 | Krankkall | 524/48 |

FOREIGN PATENT DOCUMENTS

| | | | |
|---|---|---|---|
| 0253642 | 1/1988 | European Pat. Off. | 524/52 |
| 0253643 | 1/1988 | European Pat. Off. | 524/52 |

*Primary Examiner*—Theodore Morris
*Attorney, Agent, or Firm*—Merchant, Gould, Smith, Edell, Welter & Schmidt

[57] ABSTRACT

Corrugating adhesives free of incompatibility problems with a fully hydrolyzed polyvinyl alcohol comprise a major portion of water, starch, strong base, a boric acid compound and a fully hydrolyzed water soluble polyvinyl alcohol composition.

12 Claims, No Drawings

FAST SETTING STARCH-BASED CORRUGATING ADHESIVE HAVING FULLY HYDROLYZED COLD WATER INSOLUBLE POLYVINYL ALCOHOL COMPONENT

This is a division of application Ser. No. 06/885,933, filed July 15, 1986, issued May 2, 1989 as U.S. Pat. No. 4,826,719.

FIELD OF THE INVENTION

The invention relates to a starch based adhesive composition that can be used to form corrugated board. More particularly the invention relates to a starch based adhesive that rapidly increases in viscosity to form high strength green bonds under conditions of heat and pressure resulting in increased manufacturing rates of corrugated board.

BACKGROUND OF THE INVENTION

Corrugated paper board or liner board is commonly prepared by first forming a corrugated element or medium by passing a cellulosic sheet between corrugating rolls forming a substantially sinusoidal or serpentine cross-section in the sheet. An adhesive is commonly applied to the tips of the thus formed sinusoidal portion called flutes and a noncorrugated or planar cellulosic liner is applied against the adhesive coated flutes of the corrugated elements as the corrugated sheet passes between a corrugating roll and a pressure roll. The resulting paper product having the corrugating medium on one side and the planar liner on another side is called a single-faced element. The single-faced element may be used as is in certain applications as a liner or buffer material within a container. More commonly adhesive is applied to the flute tips of the single-faced element and a second liner sheet is subsequently applied to the adhesive liner in a "double facer" operation. The second liner sheet is exposed to conditions of heat and pressure during its contact with the adhesive. In a so-called "hotplate" dryer section a continuously moving belt with a hotplate or platen surface is used to partially remove water from the adhesive bond line and establish a cured adhesive bond at elevated temperatures such as 300°–400° F.

The adhesives which have been developed to form the corrugated board or paper board are generally starch base adhesives. The earliest corrugating board adhesive patent, U.S. Pat. No. 2,102,937, discloses an adhesive composition comprising gelatinized starch, ungelatinized starch, alkali and borax in a water base. This adhesive has formed the basis for the manufacture of essentially all corrugated paper board to date. This adhesive is a carrier adhesive, wherein a portion of the starch forms a carrier gelatinized phase and the balance of the starch forms an ungelatinized phase. Under conditions of heat and pressure the ungelatinized starch rapidly gelatinizes, absorbs water and causes a rapid increase in viscosity and adhesivity of the starch-adhesive composition. Borax increases the level of viscosity as well during final gelatinization.

The use of additives in starch based corrugating board and other types of adhesives has been the subject of substantial research in recent years. One useful adhesive additive is various polymers of polyvinyl alcohol. On the whole, the use of soluble polyvinyl alcohol polymers has been avoided since soluble polyvinyl alcohol has been believed to interact with borax in the presence of alkali and starch to form useless gels. In order to avoid these difficulties a variety of patents have taught that by varying such parameters as the pH of the adhesive of the solubility of the polyvinyl alcohol, a stable polyvinyl alcohol containing adhesive can be formed. For example, Nickerson, U.S. Pat. No. 3,720,633 teaches that at acid pH's polyvinyl alcohols can be used in adhesive compositions in the presence of polyhydroxy compounds without the formation of substantial gels. Czerwin, U.S. Pat. No. 4,094,718 and Imoto, Japanese Pat. Publication No. 45-19600 teach that polyvinyl alcohol can be used in corrugating board adhesives containing starch, alkali and borax only if the polyvinyl alcohol compositions are substantially insoluble and prevented from reacting with the adhesive components until the adhesive is applied to the corrugating medium and heated past the gel temperature of the starch. Not only does Nickerson indicate that the use of soluble polyvinyl alcohols can result in the formation of intractable gels but Czerwin treats the insoluble polyvinyl alcohol in order to remove soluble polyvinyl alcohol that could solubilize and interact with the adhesive components and form a gel. However Czerwin teaches that some soluble polyvinyl alcohol tends to be present in the adhesive. In Krankkala, U.S. Pat. No. 4,600,739, certain types of partially hydrolyzed soluble polyvinyl alcohol composition below a certain concentration were found to be compatible with corrugated board adhesives containing starch, alkali and borax. The addition of the controlled amounts of a specific soluble polyvinyl alcohol was found to substantially increase green bond strength and rate of manufacture of the corrugated board. The amounts of the soluble polyvinyl alcohol that can be used is limited by the fact that at higher concentrations than claimed the soluble polyvinyl alcohols tend to form the gels recognized in Czerwin and Imoto. Further, soluble polyvinyl alcohol tends not to provide any substantial water resistance to the glue line since the polyvinyl alcohol composition is stable.

The speed at which corrugating machines can be run is limited by the rapidity of viscosity increase in the bond line between the liner and corrugated medium. As the viscosity of the adhesive rises under conditions of heat and pressure in the corrugating machine, a "green bond" is formed which holds the components together until the adhesive system forms the final heat-cured corrugated bond. The green bond relies solely on the viscosity of the product to maintain the integrity of the product during curing.

Conventional starch based adhesives rely on the response of borax and ungelatinized starch under conditions of heat and pressure to increase the viscosity of the adhesive during green bond formation. More recent corrugating adhesives containing the additionally insoluble polyvinyl alcohol utilize the increase in viscosity that results as the polyvinyl alcohol is solubilized at high temperature. However, both the conventional and the solid polyvinyl alcohol containing conventional adhesives increase viscosity at a rate that leaves substantial room for improvement. If the rate at which viscosity increase occurs in the bond line can be increased, then the corrugating machines can be run at a substantial increase in speed resulting in an increase in productivity.

Accordingly a substantial need exists for a corrugating adhesive having a faster set or a substantial increase in the rate of viscosity development or in the rate of green bond formation during the manufacture of corrugated board.

BRIEF DESCRIPTION OF THE INVENTION

We have learned that problems relating to the incompatibility of polyvinyl alcohol compositions can be solved and an adhesive having a substantially improved green bond strength, and fast set or increase in the rate of viscosity increase can be achieved by adding to a corrugating adhesive comprising starch, alkali base, boric acid and water, an amount of a fully hydrolyzed cold water insoluble polyvinyl alcohol composition wherein the polyvinyl alcohol is in solution not suspension. Preferably the polyvinyl alcohol is added to the adhesive in the form of a solution of the polyvinyl alcohol in water. We have found that, contrary to the teachings of the art, that the incompatibility of polyvinyl alcohol compositions can be controlled by carefully controlling the amount of polyvinyl alcohol in relation to boric acid in the final adhesive composition and by selecting a fully hydrolyzed polyvinyl alcohol composition of appropriate molecular weight. Further a selection of a preferred lower molecular weight polyvinyl alcohol can improve the compatibility of the adhesive and the polyvinyl alcohol.

While we do not wish to be held to a theory of action of the invention, we believe that the problems relating to phase separation and gelling in polyvinyl alcohol containing adhesive is directly related to an interaction between the hydroxyl groups of the starch or boric acid with hydroxyl groups of the polyvinyl alcohol. We have further found that in formulating corrugating adhesives with the partially hydrolyzed polyvinyl alcohol that there is a threshold concentration of the fully hydrolyzed soluble polyvinyl alcohol above which substantial gelling or incompatibility results. However, below the threshold polyvinyl alcohol acts to substantially increase fast set and strength of the green bond during corrugating board manufacture. Since the polyvinyl alcohol is in solution, the rate of green bond formation is increased by the presence of the alcohol, but is not limited by the rate of dissolution of a solid polyvinyl alcohol. Since green bond formation is increased corrugating machine speeds can be increased proportionately. Still further, we have found that the fully hydrolyzed polyvinyl alcohol adds to the water resistance of the corrugated board since the polymer is water insoluble at typical use temperatures.

DETAILED DESCRIPTION OF THE INVENTION

Briefly, the novel water-resistant corrugated board adhesives of this invention are prepared by forming an aqueous emulsion, having an alkaline pH containing a solubilized fully hydrolyzed PVOH, starch, a strong alkali metal hydroxide base and a boric acid compound and optionally a basically reacting crosslinking resin, and wax. The corrugated paper board adhesive of this invention is preferably formed from a suspension of starch particles in water. The viscosity and solids content are important factors influencing the speed with which the paper board machine can be operated and also effects the quality of the finished paper board. The suspending paste or carrier medium must be sufficiently viscous to maintain a smooth suspension of the starch particles, but not so viscous as to interfere with the application of the adhesive to the paper board. The nature and proportion of dissolved solids in the carrier medium influences both pot life and the speed with which a given paper stock absorbs water from the applied adhesive. The water content of the adhesive affects adhesive properties. A small degree of water absorption from the adhesive to the paper is desirable in forming strong bonds between the paper plies. Absorption of water beyond that required to give good bonding is undesirable since it robs the adhesive of water needed to complete the gelatinization of the suspended starch upon heating in the corrugator and leads to inferior bonding.

POLYVINYL ALCOHOL

The cold water insoluble polyvinyl alcohol (PVOH), a polyhydroxy polymer having a polymethylene backbone with pendent hydroxy groups, is a synthetic resin that removes better than 98.5% of the acetyl group and in certain grades of polymer better than 99% of the acetyl groups. It is produced by the hydrolysis of polyvinyl acetate. The theoretical monomer:

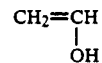

does not exist. It is commonly available as a dry solid and is available in granular or powdered form. PVOH grades include a "super" hydrolyzed form (99.3% plus removal of the acetate group), and a fully hydrolyzed form (99% + removal of the acetate group). The properties of the resins vary according to the molecular weight of the parent polymer and the degree of hydrolysis. Polyvinyl alcohols are commonly produced in nominal number average molecular weights that range from about 20,000 to 100,000. Commonly the molecular weight of commercial polyvinyl alcohol grades is reflected in the viscosity of a 4 wt-% solution measured in centipoise (cP) at 20° C. with a Brookfield viscometer. The viscosity of a 4% solution can range from about 5 to about 65 cP. Variation in film flexibility, water sensitivity, ease of solvation, viscosity, block resistance, adhesive strength, dispersing power can all be varied by adjusting molecular weight or degree of hydrolysis. Solutions of polyvinyl alcohol in water can be made with large quantities of lower alcoholic cosolvents and salt cosolutes. Polyvinyl alcohols can react with aldehydes to form acetals, can be reacted with acrylonitrile to form cyanoethyl groups, and can be reacted with ethylene or propylene oxide to form hydroxy alkylene groups. Polyvinyl alcohols can be readily crosslinked and can be borated to effect gellation.

Polyvinyl alcohol is made by first forming poly-vinyl acetate or a vinyl acetate containing copolymers such as an ethylene vinyl acetate copolymers and removing the acetate groups using a base catalyzed alkanolysis. The production of polyvinyl acetate or a vinyl acetate copolymer can be done by conventional processes which controls the ultimate molecular weight. Catalyst selection temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products & Chemicals, Inc. under the tradename VINOL ®, by duPont under the trade name ELVANOL ® and by Monsanto under the trade name GELVITOL ®.

The preferred polyvinyl alcohol compositions for use in this invention comprise polyvinyl alcohol made from a homopolymer or interpolymer of vinyl acetate that is fully hydrolyzed, i.e. greater than about 98.5 to 99% of the hydroxyl groups are free of acetate or super hydrolyzed, greater than 99.3% of hydrolysis. The preferred fully hydrolyzed polyvinyl alcohol is available in low, medium or high molecular weight variations characterized by the Brookfield viscosity of a 4 wt-% aqueous solution at 20 degrees. The low molecular weight polyvinyl alcohol (MW 11,000 to 31,000) has a viscosity of about 4–10 cP, the medium molecular weight composition (MW =77,000 to 79,000) has a viscosity of about 15–30 cP and a high molecular weight composition (MW 106,000 to 110,000) has a viscosity of about 35–60 cP. The preferred polyvinyl alcohol compositions have a reduced particle size adapting the composition for rapid dissolution. The particle size of the most preferred polyvinyl alcohol is such that 99+% of the product will pass through a −80 mesh screen.

The most preferred polyvinyl alcohol composition is made from a low to medium molecular weight homopolymer of vinyl acetate that is fully hydrolyzed. The use of higher molecular weight polymers are more likely to gel at higher concentrations.

STARCH

The starch based adhesives of this invention are commonly characterized as being either a carrier adhesive, a no carrier adhesive, or a carrier/no carrier adhesive. The term carrier adhesive implies the presence of a thin base of gelatinized starch in which ungelatinized or nonhydrated starch particles are emulsified or suspended. The term no carrier adhesive implies the substantial absence of gelatinized or hydrated starch in the adhesive emulsion. The term carrier/no carrier adhesive implies that the distinction between gelatinized starch and ungelatinized starch is not clear in the adhesive composition. Generally carrier/no carrier adhesives are prepared in a way that a substantial amount of partly hydrated or partly gelatinized starch is formed. These terms are imprecise since during the preparation of the starch based adhesives some starch inherently becomes gelatinized during processing at any temperature. However substantial proportions of starch remain ungelatinized and nonhydrated during preparation which can gelatinize and interact with PVOH, and borax during green bond formation.

The starch used in both the carrier phase and suspended starch phase is a commodity chemical produced from a number of root, stem or fruit, plant sources. Starch is a high molecular weight polymeric carbohydrate polysaccharide, most commonly composed of six carbon monosaccharide units joined by alpha-glycan linkages having an approximate molecular formula of $(C_6H_{10}O_5)_n$, wherein n equals 10hu 2to $10^6$. Starch occurs naturally in the form of white granules and comprise linear and branched polysaccharide polymers. Starch is commonly manufactured by first soaking and grinding the plant starch source, and separating the starch from waste matter. The starch is commonly reslurried and processed into a finished dried starch product. Commercial starch often has the form of a pearl starch, powdered starch, high amylose starch, precooked or gelatinized starch, etc. Preferably pearl starch is used in making both the carrier phase and the particulate starch suspended in the carrier.

BASE

The novel adhesive compositions of the invention contain a strong base which promotes the production of crosslinking species from the resin and acts to cure the adhesive. Essentially any strong base can be used, however preferred bases are alkali metal hydroxides. The most preferred strong bases include sodium and potassium hydroxide. The strong base also lowers the gel point of the starch, which increases the rate of hydration of the starch during curing of the glue line.

BORIC ACID COMPOUND

The novel adhesive compositions of the invention include a boric acid compound which cooperates with the gelatinized and nongelatinized starch during heating and curing by reacting with available hydroxyl groups of the starch, forming a starch borax complex which aids in gelling the carrier starch molecules and the suspended starch molecules. The cooperative reaction increases the tack of the adhesive and produces strong bonds. Any boric acid compound having free hydroxyl groups attached to the boron atom can be used, however commercial boric acid (orthoboric acid, $H_3BO_3$ and its hydrated forms $H_3BO_3$-$H_2O$) and borax (sodium tetraborate decahydrate, $Na_2B_4O_7$-$XH_2O$ and other hydrate and anhydrous forms) are commonly used. For a discussion of boric acid compounds such as boron oxides, boric acids and borates, see Kirk-Othmer Encyclopedia of Chemical Technology, 2nd Edition, Vol. 3, pp. 608–652. The boric acid compound increases the tackiness, viscosity, and cohesive strength of the adhesive. As the adhesive cures in the glue line, a gel structure forms between the hydroxyl group of the polysaccharide, the basic acid compound and the PVOH. The exact mechanism of the crosslinking reaction between these compounds is unknown. Further, the borax buffers the caustic nature of the base used in the adhesive stabilizing the adhesive to the hydrolytic effect of the base.

CROSSLINKING RESINS

Resins that can be used in the novel adhesive compositions of this invention include resins that upon heating in basic media generate crosslinking species that react with and crosslink the hydroxyls in adjacent starch molecules. The crosslinking reagent tends to reduce the hydrophilic nature and the water solubility of the starch molecules by effectively removing the availability of hydroxyl groups to water and by introducing aliphatic alkylene-type crosslinking moieties.

A preferred class of crosslinking resins comprise well known condensation products of the reaction of a ketone and an aldehyde compound. These resins are characterized as a polyether polymer but can contain a variety of other monomers such as urea, melamine, etc. In the presence of heat and base, they commonly decompose to produce species that effectively crosslink the starch molecules. Preferred resins are acetone-formaldehyde resins, acetone-urea-formaldehyde resins, acetone-melamine-formaldehyde resins comprising 15 to 30 wt-% acetone, about 5 to 50 wt-% formaldehyde and 0 to 15 wt-% of third monomer. One example of the preferred crosslinking resin embodiment of this invention comprises the Ketack series of resins manufactured by American Cyanamide.

WAX

The term wax is used very broadly and is applied to a wide variety of materials. The materials can have properties resembling certain well known waxes or can be used to provide physical properties similar to those associated with well known properties of wax such as sealing, polishing, candle making, etc. Many waxy substances have been found in nature and have been known to be useful for many years.

Historically waxes include substances that are natural products. Chemically natural waxes are esters of fatty acids and monohydric fatty alcohols. Physically waxes are water repellant solids having a useful degree of plastic character. However, modern waxes include various synthetic substances that can replace natural waxes in many preparations. The composition of natural waxes generally comprise an ester of a saturated fatty acid and a long chain monohydric alcohol. Long chain fatty acids often include acids having greater than 16 carbon atoms and most commonly about 26 carbon atoms. The aliphatic monohydric alcohol commonly has at least 14 and can range as high as 36 carbon atoms. Petroleum, mineral or other synthetic waxes often consist of saturated hydrocarb having aliphatic or open chain structures with relatively low branching or side chains.

Particularly preferable waxes for the water resistant corrugated board adhesive are waxes such as petroleum waxes, candelilla wax, beeswax, etc. Particularly preferred waxes are the petroleum waxes such as microcrystalline waxes, slack waxes and paraffin waxes.

In somewhat greater detail, the novel fast set corrugating adhesives of this invention can made by combining the ingredients in water and heating the mixture until a smooth uniform composition is formed. Preferably the adhesive is made by combining a starch slurry with a solution of the base in water heating the mixture to at least partially gelatinized the starch and then adding the remaining components under conditions of mixing to form the smooth corrugated adhesive. Since the polyvinyl alcohol is cold water insoluble, it must be exposed to heat in the presence of free water to be solubilized. Preferably, a water solution of the polymer is premade by adding the polyvinyl alcohol to water and then heating with stirring until dissolved. The adhesive can contain from about 5 to 75 parts of starch and about 0.1 to about 10 parts of base per 100 parts of the adhesive composition. In "carrier" adhesives the carrier phase comprises about 1 to 25 parts of starch and the ungelatinized phase comprises 5 to 50 parts of starch per each 100 parts of adhesive. The adhesive can contain about 0.1 to 5 parts of boric acid per each 100 parts of water and optionally about 0.1 to 5 parts of basically reacting crosslinking resin per 100 parts of water and about 0.1 to 5 parts of wax in an emulsion form per each 100 parts of water.

The fast setting adhesive of this invention contain about 0.01 to 2.0 parts of polyvinyl alcohol per each 100 parts of adhesive. Preferably the adhesive contains about 0.1 to 1.5 parts of polyvinyl alcohol and most preferably for reasons of rapid set and compatibility with the adhesive components about 0.25 to 1.25 parts of polyvinyl alcohol per 100 parts of adhesive. The ratio of polyvinyl alcohol to boric acid is important in the invention since the interaction between polyvinyl alcohol and boric acid can cause substantial gelling problems and the manufacture of the adhesive. Accordingly, polyvinyl alcohol is used in a ratio of less than 9 parts by weight of polyvinyl alcohol per each part of boric acid, preferably 1 to 8 parts of polyvinyl alcohol per part of boric acid and most preferably 2 to 7 parts of polyvinyl alcohol per each part of boric acid for reasons of obtaining a fast setting adhesive free of unacceptable component interactions.

EXAMPLE I

Into a 1200 milliliter stainless steel beaker immersed in a 200° F. water bath equipped with an electrically driven blade mixer was placed 800 grams of deionized water. Into the water was placed 100 grams of a fully hydrolyzed low molecular weight polyvinyl alcohol composition (VINOL 107 Air Products). The contents of the beaker were stirred until dissolution was complete. Sufficient deionized water was added to the beaker to prepare 1 liter of solution.

EXAMPLE II

Into an about 6 liter stainless steel steam heated vessel having an inverted trapezoid cross-section equipped with an electrically drive propeller blade mixer was placed 1,668 kilograms of water. 791.2 grams of pearl (corn) starch was added to the water. The contents were mixed until uniform for 5 minutes and into the starch suspension was, added slowly, drop-wise over a 15-minute period, a solution of 24 grams of sodium hydroxide in 416 grams of water. After the addition of the sodium hydroxide solution, the mixture was heated to about 96° F. resulting in a viscosity of 20 #5 Zahn cup seconds. Into the blended, smooth emulsion of starch was added 10 grams of boric acid. The resulting starch based adhesive was 27.6 wt-% solids. The mixture was stirred for 10 minutes until uniform and 88.4 grams of a 10 wt-% solution of a fully hydrolyzed low molecular weight polyvinyl alcohol (VINOL 107) was added. The mixture was stirred for 15 minutes. The product had a viscosity of 11.4 #5 Zahn cup seconds.

EXAMPLE III

Into a stainless steel beaker in a heated water bath equipped with an electrically driven blade mixer was placed 25.5 grams of deionized water. Into the water was placed 12.5 grams of Clinton 121B starch. The mixture was stirred and heated to 130° F. When the starch suspension became uniform, a pre-mix solution of 27.0 grams of sodium hydroxide and 62.5 grams of deionized water was added drop-wise over a 5 minute period. After addition was complete the suspension was mixed for 15 minutes. After mixing 437.8 grams of water was added to the primary stainless steel beaker to cool the solution. The resulting solution was mixed until uniform.

In a secondary stainless steel beaker in the water bath equipped with an electrically driven blade mixer was added 2081.2 grams of deionized water. The water was heated to a temperature of 90° F. and into the water was added 1050.0 grams of Clinton 121B starch along with 12.6 grams of 5-mol borax. The contents of the secondary stainless steel beaker were mixed for 10 minutes and the contents of the primary beaker was added to the secondary beaker drop-wise over a 30 minute period. After the addition was complete the mixing was continued until the contents of the beaker was smooth. Into the smooth suspension was added 120.0 grams of a 10 wt-% solution of a low molecular weight, fully hydrolyzed polyvinyl alcohol (Air Products VINOL 107). After the addition of the polyvinyl alcohol solution the mixture was stirred until uniform. The fully formulated corrugating adhesive had a viscosity of 9.0 #5 Zahn cup seconds.

EXAMPLE IV

A stock solution of sodium hydroxide, 5-mol borax and water was prepared which is representative of a corrugating adhesive mixture without the starch.

| Water | 4160 g |
|---|---|
| NaOH | 38 g |
| 5-mol Borax | 17 g |

To a 500 g aliquot of the stock solution was added solutions of various polyvinyl alcohols. The amount of alcohol initially added to the stock solution is equivalent to the amount of PVOH added to a starch corrugating adhesive.

| Experiment | PVOH Added | Time | Observations |
|---|---|---|---|
| 1 | 19 g 10% V-425 | 0 | Clear, no gel |
| 2 | 1 + 19 g 10% V-425 | 8 min. | Clear, no gel |
| 3 | 2 + 19 g 10% V-425 | 20 min. | Clear, no gel |
| 4 | 57 g 10% V-425 | 0 | Clear, no gel |
| 5 | 19 g 10% V-107 | 0 | Clear, no gel |
| 6 | 5 + 19 g 10% V-107 | 13 min. | Clear, no gel |
| 7 | 6 + 19 g 10% V-107 | 35 min. | Clear, no gel |
| 8 | 57 g 10% V-107 | 0 | Clear, no gel |
| 9 | 19 g 10% V-350* | 0 | Gel particles |
| 10 | 19 g 10% V-350 + 19 g H$_2$O | 0 | Clear, no gel |
| 11 | 10 + 19 g 10% V-350 + 19 g H$_2$O | 10 min. | Clear, no gel |
| 12 | 11 + 38 g 5% V-350 | 20 min. | Clear, no gel |
| 13 | 114 g 5% V-350 | — | Clear, no gel |
| 14 | 28.5 g 7.5% V-325 | 0 | Clear, no gel |
| 15 | 14 + 28.5 g 7.5% V-325 | 10 min. | Small gel particles |
| 16 | 15 + 28.5 g 7.5% V-325 | 28 min. | Small gel particles |
| 17 | 85.5 g 7.5% V-325 | 0 | Small gel particles |

A 10% solution of VINOL 325 formed large gel particles upon addition to the stock solution.

| 18 | 3.1 g 20% V-205, 9.5 g 10% V-107 | 0 | Clear, no gel |
|---|---|---|---|
| 19 | 18 + 20% V-205, 9.5 g 10% V-107 | 20 min. | Clear, no gel |
| 20 | 19 + 20% V-205, 9.5 g 10% V-107 | 25 min. | Clear, no gel |
| 21 | 9.3 g V-205, 28.5 g V-107 | 0 | Clear, no gel |
| 22 | 3.1 g 20% V-205, 9.5 g V-325, 5 g H$_2$O | 0 | Slightly cloudy, no gel |
| 23 | 22 + 20% V-205, 9.5 g V-325, 5 g H$_2$O | 6 min. | Slightly cloudy, no gel |
| 24 | 23 + 20% V-205, 9.5 g V-325, 5 g H$_2$O | 15 min. | Slightly cloudy, no gel |
| 25 | 9.3 g 20% V-205, 28.5 g V-325, 15 g H$_2$O | 0 | Slightly cloudy, no gel |

*High molecular weight fully hydrolyzed

The table of data shows that the amount of the high molecular weight fully hydrolyzed PVOH placed in solution must be carefully controlled to avoid gellation and compatibility problems.

| Polyvinyl | Molecular wt |
|---|---|
| V-107 | about 28,000–44,000 |
| V-203 | about 17,000–26,000 |
| V-205 | about 33,000 |
| V-350 | about 212,000 |
| V-425 | about 135,000 |
| V-523 | about 43,000 to 103,000 |
| V-540 | about 127,500 |

The above discussion, Examples and data illustrate our current understanding of the invention. However, since many variations of the invention can be made without departing from the spirit and scope of the invention, the invention resides wholly in the claims hereinafter appended.

I claim:

1. An aqueous fast setting corrugating adhesive composition that can provide an increase in green strength, which comprises in an aqueous emulsion a major proportion of water, about 5 to 75 parts of starch per 100 parts of adhesive composition, sufficient alkaline metal hydroxide to provide an alkaline pH, about 0.1 to 5 parts of boric acid compound per 100 parts of water and an effective amount of a fully hydrolyzed polyvinyl alcohol composition sufficient to increase the strength and rate of formation of the green bond, said polyvinyl alcohol being solubilized in said adhesive composition before application.

2. The composition of claim 1 wherein the polyvinyl alcohol composition is present at a concentration of about 0.01 to 4.0 parts by weight per each 100 parts of the adhesive composition.

3. The composition of claim 1 wherein the weight ratio of polyvinyl alcohol composition to boric acid composition is less than 9:1.

4. The composition of claim 1 wherein the polyvinyl alcohol composition is a low molecular weight polyvinyl alcohol.

5. The composition of claim 4 wherein the fully hydrolyzed polyvinyl alcohol composition has a degree of hydrolysis of about 98.5% or greater.

6. The composition of claim 5 wherein the fully hydrolyzed polyvinyl alcohol composition has a degree of hydrolysis of about 99% or greater.

7. The composition of claim 5 wherein the particle size of the polyvinyl alcohol is less than 80 mesh.

8. The composition of claim 1 wherein the starch is present in the form of ungelatinized starch particles suspended in a carrier phase of gelatinized starch in an aqueous emulsion wherein there are about 0.01 to 10 parts of gelatinized starch and about 0.01 to 40 parts of ungelatinized per 100 parts of the aqueous adhesive composition.

9. The composition of claim 1 wherein the pH of the aqueous adhesive composition is between 9 and 13.

10. The composition of claim 1 wherein the pH of the aqueous adhesive composition is between 11 and 12.

11. The composition of claim 1 wherein the alkaline metal hydroxide is sodium hydroxide which is present at a concentration of about 0.02 to 0.75 parts of sodium hydroxide per 100 parts of the aqueous adhesive composition.

12. The composition of claim 1 wherein the boric acid compound is $H_3BO_3 \cdot XH_2O$ or $Na_2B_4O_7 \cdot XH_2O$, wherein X is a number from 0 to 10, and is present in the aqueous adhesive composition at a concentration of about 0.1 to about 5 parts or boric acid compound per each 100 parts of the composition.

* * * * *

UNITED STATES PATENT AND TRADEMARK OFFICE
CERTIFICATE OF CORRECTION

PATENT NO. : 4,933,383

DATED : June 12, 1990

INVENTOR(S) : Thomas O. Murdock et al.

It is certified that error appears in the above-identified patent and that said Letters Patent is hereby corrected as shown below:

In Column 2, line 37, "soluble." read as --soluble--.

In Column 5, line 57, "10hu 2to" read as --$10^2$ to--.

In Column 7, line 25, "hydrocarb" read as --hydrocarbons--.

In Column 8, line 14, "107 Air" read as --107 -Air--.

In Column 8, line 43, "25.5" read as --625.5--.

In Column 8, line 44, "12.5 read as --112.5--.

In Column 10, line 2, "Polyvinyl" read as --Polyvinyl Alcohol--.

In Column 10, lines 1-9, the table should read:

UNITED STATES PATENT AND TRADEMARK OFFICE
CERTIFICATE OF CORRECTION

PATENT NO. : 4,933,383

DATED : June 12, 1990

INVENTOR(S) : Thomas O. Murdock et al.

It is certified that error appears in the above-identified patent and that said Letters Patent is hereby corrected as shown below:

In Column 10, lines 1-9, the table should read:

| Polyvinyl Alcohol | Molecular wt |
|---|---|
| V-107 | about 24,000-44,000 |
| V-203 | about 17,000-26,000 |
| V-205 | about 33,000 |
| V-350 | about 212,000 |
| V-425 | about 135,000 |
| V-523 | about 93,000 to 103,000 |
| V-540 | about 127,500 |

Signed and Sealed this

Twentieth Day of August, 1991

Attest:

HARRY F. MANBECK, JR.

Attesting Officer

Commissioner of Patents and Trademarks